Feb. 27, 1962   R. J. HERSCHLER   3,023,074
PROCESS FOR MODIFYING NYLON CONTAINING FABRIC WITH A SOLUTION
OF ANHYDROUS ZINC CHLORIDE IN A LOWER DIALKYL
SULFIDE AND PRODUCTS PRODUCED THEREBY
Filed Nov. 7, 1958
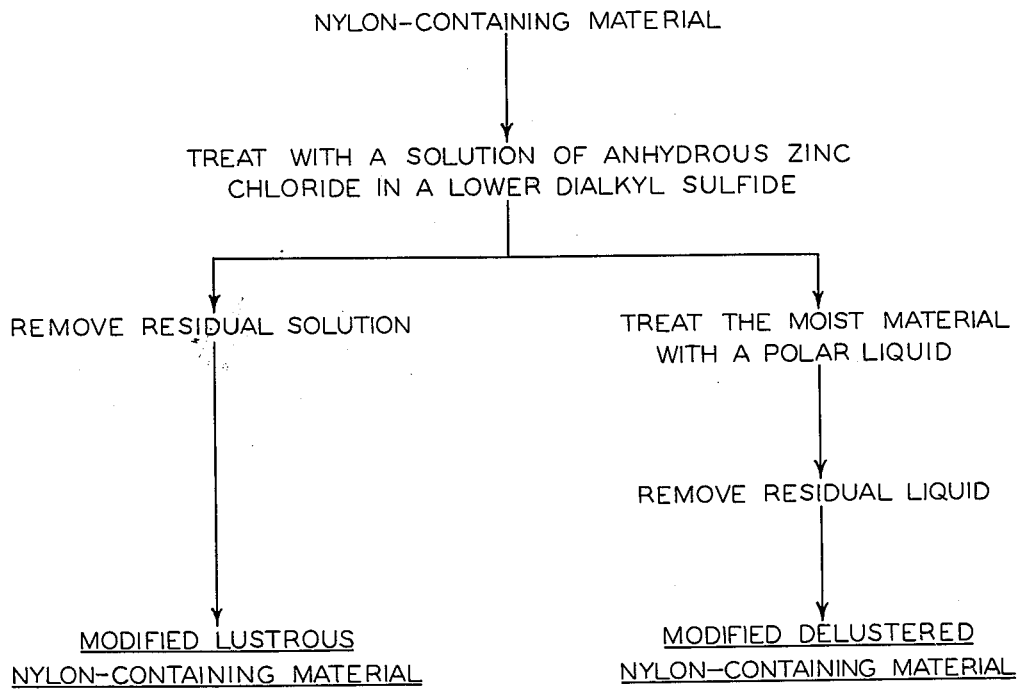
*INVENTOR.*
ROBERT J. HERSCHLER
BY  J. R. Segree
AGENT 3,023,074
PROCESS FOR MODIFYING NYLON CONTAINING FABRIC WITH A SOLUTION OF ANHYDROUS ZINC CHLORIDE IN A LOWER DIALKYL SULFIDE AND PRODUCTS PRODUCED THEREBY
Robert J. Herschler, Camas, Wash., assignor to Crown Zellerbach Corporation, San Francisco, Calif., a corporation of Nevada
Filed Nov. 7, 1958, Ser. No. 772,427
17 Claims. (Cl. 8—130.1)

This invention relates ot nylon-containing materials. More particularly, it relates to a process of modifying such materials by imparting thereto several desirable properties and to products derived therefrom.

It is known that nylon, or synthetic polyamide, has several inherent desirable properties such as strength, tenacity, abrasion resistance, high melting point, solvent and chemical resistance, etc. However, nylon fiber or a fabric manufactured therefrom is not entirely satisfactory for many applications because of certain disadvantages, including its translucency, its nearly frictionless surface, lack of substantivity to many dyes, lack of dimensional stability and a relatively rapid loss of moisture and a slow pick-up thereof thereby affecting adversely its tenacity, a high capacity of collecting static electricity and inability of the fiber alone to be formed into a continuous web of non-woven fabric.

It has now been found that the above mentioned deficiencies can be overcome by treating nylon-containing materials in a special manner thereby modifying many of its inherent properties and producing a new article of manufacture having unique and unusual characteristics.

It is an object of this invention to provide a novel modified nylon-containing material.

A further object is to provide a modified nylon-containing material having greater usefulness than similar materials manufactured heretofore.

Another object of this invention is to provide a process for preparing modified nylon-containing materials which is readily applicable to commercial equipment.

Other objects will become apparent from the more detailed description of the present invention which follows.

The attached drawing illustrates by means of self-explanatory flow sheet, the process of this invention.

Briefly, in accordance with this invention, a nylon-containing material is treated with a solution of substantially anhydrous zinc chloride in a lower dialkyl sulfide. The residual solution is thereafter removed from the treated material to produce the resulting modified material.

A nylon-containing material treated in the manner described hereinabove exhibits the following properties, as compared to those of an untreated fabric:

(1) Its surface has a significantly higher coefficient of friction.
(2) It has a much more rapid moisture pick-up after thorough drying.
(3) Its surface is covered with a continuous snow-white coating which is strongly bonded to the fabric and is resistant to chemical and physical action.
(4) It is stiff and has a crisp feel.
(5) It is opaque.
(6) Its substantivity to dyes is considerably improved.
(7) It is dimensionally more stable.
(8) It carries a lower charge of static electricity.

The nylon-containing materials suitable in the practice of this invention include nylon fiber-containing fabric materials consisting wholly of nylon, such as nylon-6,6, the copolymer of hexamethylenediamine-1,6 and adipic acid; nylon-6, the polymer of 6-aminocaproic acid; and nylon-6,10, the copolymer of hexamethylenediamine-1,6 and sebacic acid. Other fabric materials containing nylon blended with various synthetic or natural fibers are equally suitable for treatment by the process of this invention. Such materials may be employed in the form of a fabric, yarn, thread, cord, or a non-woven web.

The treating solution is prepared by simply dissolving substantially anhydrous zinc chloride in a lower dialkyl sulfide. Zinc chloride which had absorbed a substantial quantity of water is undesirable since its solubility in a dialkyl sulfide is markedly reduced.

Lower dialkyl sulfides which are suitable in the preparation of the treating solution comprise dimethyl sulfide, methyl ethyl sulfide, diethyl sulfide, methyl propyl sulfide, methyl butyl sulfide, etc. and mixtures thereof. However, dimethyl sulfide is my preferred solvent for zinc chloride.

The solution of zinc chloride in a dialkyl sulfide may vary widely in its strength. The concentration of zinc chloride may vary broadly from 0.01% to 50% and preferably from 1 to 15% by weight. The concentration of the treating solution selected for the treatment will depend on the nature of the material to be treated and the effect desired.

If desired, the treating solution may be diluted with a solvent which must be miscible with and non-reactive with either of the two constituents of the solution or with the reaction products formed. Examples of suitable solvents are chloroform and methanol.

Furthermore, thickening agents such as epoxy resins, rosin, polyisobutylmethacrylate, etc. may be employed as additives to the treating solution in order to raise its viscosity.

The treating solution described hereinabove may be applied to the nylon-containing material in any convenient manner, such as by immersion, spraying, dipping, or coating. Although the temperature of the treating solution may vary from normal room temperature to slightly below the boiling point of the dialkyl sulfide employed, it is preferred to apply this solution to the material at a temperature of between 20° and 30° C.

The nylon-containing material is subjected to the action of the treating solution for a very brief period of time which will depend on the type of material employed and on the desired properties to be imparted thereto. In general, a period of from 1 second to a few minutes is sufficient.

In certain cases, particularly when a non-woven nylon-containing fabric or felt is to be subjected to the treatment with the solution of zinc chloride in a lower dialkyl sulfide, best results are obtained if the material is compressed while immersed in the treating solution. The amount of pressure applied to the material while it is passed through the treating solution may vary depending on the final characteristics of the material desired. In general, the greater the pressure during the treatment, the lower the caliper of the treated material, the greater the number of fiber to fiber bonds and consequently the stronger the resulting material. If a nylon fiber web is to be treated, it may be conveyed in facial contact with the two open-area carriers. The resulting assembly may be passed through the treating solution and the moist web may be then passed through a compression zone to express excess liquid from the web through the carriers. The residual liquid is finally removed from the web by drying.

When it is desired to produce a modified nylon-containing material in accordance with the present invention, which material will be characterized by several improved properties but unchanged luster, the residual treating solution is removed from the treated material by drying the same at room temperature or by heating in a dry-heat zone. The resulting dry material retains its original luster but has several highly desirable properties improved, including stiffness, dimensional stability, fiber to fiber bond, and dyeing.

In another embodiment of this invention the nylon-containing material still containing an excess of the residual solution of zinc chloride in a lower dialkyl sulfide is subjected to a secondary treatment with a polar liquid such as water, steam, certain organic solvents, such as methanol, ethanol, etc. or vapors thereof. The preferred polar liquid is water.

I have found unexpectedly that the secondary treatment with a polar liquid as described hereinabove produces a white coating on the surface of the material treated with the solution of zinc chloride in a lower dialkyl sulfide. In addition to many desirable benefits imparted by this secondary treatment, followed by removal of the residual liquid by drying or other suitable method, the modified nylon-containing material is substantially delustered. This delustering effect is frequently regarded as highly desirable in many applications in which nylon-containing materials are useful.

The following examples are given to illustrate various embodiments of this invention. It will be understood, however, that they are not intended to limit it in any manner.

EXAMPLE 1

A tight weave nylon fabric suitable for use in the manufacture of women's blouses was washed in detergent and water to remove substantially all of the surface size. The washed fabric was cut into strips which were immersed in a 5% by weight solution of substantially anhydrous zinc chloride in dimethyl sulfide for 30 seconds. The impregnated strips were next immediately passed through a pair of squeeze rolls to remove the excess of the solution and air-dried. The resulting fabric had improved fiber to fiber bond, improved wetting characteristics in water, more rapid moisture pick-up, greater substantivity to dyes which are not substantive to untreated nylon fabrics and markedly improved stiffness, as compared to the original untreated fabric. In addition the luster of the resulting modified fabric remained unchanged.

EXAMPLE 2

The same fabric as described in Example 1 was treated in the same manner as in Example 1 except that the immersion time was 60 seconds. Immediately following the immersion period, the fabric swatches were dipped in water at 20° C. while still containing an excess of the impregnating solution. The treated fabric was air-dried. The resulting modified nylon fabric was delustered and further characterized by reduced accumulation of static electricity, increased crispness or stiffness, significantly improved whiteness and good substantivity to yellow dye Color Index 40001. Furthermore, its surface possessed a higher coefficient of friction, the fibers were firmly bonded together and did not ravel away at selvedge edge, it regained 2.8% moisture in 15 minutes after drying at 110° C. while the untreated fabric regained only 0.7% moisture under the same conditions, and its laundering in detergent carrying water and dry cleaning solvents did not affect any of the newly acquired properties. Its opacity, as indicated by standard Y values on G.E. Recording Spectrophotometer was 51.37%, as compared to 47.29% for the untreated fabric, each value being calculated by the standard tristimulus method.

EXAMPLE 3

A loose-weave nylon netting was treated as described in Example 2 except that the immersion period in the solution was 120 seconds. The modified material was characterized by similar properties as the treated material of Example 2. In addition, the material was sufficiently stiff so that a cone formed thereof was free standing.

EXAMPLE 4

The treatment described in Example 3 was repeated except that absolute methanol was employed in the secondary treatment instead of water. Substantially similar results were obtained.

EXAMPLE 5

A square of nylon-6,6 fiber ⅛ inch thick was placed between two glass plates and compressed therebetween under a pressure of about 5 lbs. per square inch. The assembly was immersed for 10 seconds as described in the previous example, except that the immersion period was 10 seconds and the temperature of water used in the secondary treatment was 80° C. After the treatment with water the residual liquid was substantially removed. It was observed that the material whitened almost instantly after immersion in the solution of zinc chloride in dimethyl sulfide. The resulting modified delustered material was well unified, had excellent dimensional stability and a very strong fiber to fiber bond in either dry or wet form. It was suitable for padding or filter cloth.

EXAMPLE 6

Example 5 was repeated with the use of nylon-6 fiber which was immersed for 5 seconds in a 10% by weight solution of zinc chloride in dimethyl sulfide. Immediately after impregnation, a portion of the treating solution was removed by placing the material between layers of absorbent paper and thereafter the material while still moist was immersed in a 20° C. water bath for a few seconds, at the end of which period both the solvent and the salt not retained by the material were washed out. The results obtained were similar to those of Example 5.

EXAMPLE 7

A ¼ inch thick air-laid web of nylon-6 was placed between two metallic screen plates of 150-mesh and compressed under applied pressure of about 10 lbs. per square inch. The material was treated while under pressure in a 5% by weight zinc chloride in dimethyl sulfide solution for 10 seconds. Thereafter the excess of the solution was drained off and the moist material was dipped for a few seconds in water bath at 40° C. After the pressure was released, the modified delustered material was observed to have a lower caliper than the treated material of Example 6. Furthermore, the treated material had a markedly stronger fiber to fiber bond compared to a material treated under the same conditions but without pressure applied thereto.

EXAMPLE 8

A ⅛ inch thick web of 10 millimeters long nylon-6,6 fiber of 3 denier per foot was air-laid over a bowl shaped mold. A light pressure was applied thereto to compress it evenly over the mold and the material was treated with a 10% by weight solution of zinc chloride and dimethyl sulfide for 10 seconds, after which period a portion of the treating solution was drained away and the material, while still moist, was immersed in a water bath at 40° C. for a few seconds, then air-dried. The resulting modified material was set in shape of the mold and had properties similar to those of the material described in Example 7.

EXAMPLE 9

The procedure of Example 2 was repeated with the use of a 5% by weight zinc chloride solution of equal volumes of dimethyl sulfide and chloroform. The results were substantially similar to those obtained in Example 2.

EXAMPLE 10

Brushes produced from nylon bristles were treated as described in Example 6 except that the immersion in the treating solution was 30 seconds. The modified bristles were markedly whitened and stiffened and the properties imparted thereto were not noticeably altered after several applications of the treated brushes in the cleaning of glassware.

EXAMPLE 11

Sheets composed of 95 parts by weight of nylon-6,6 of 3 denier per foot, 10 millimeters long fibers and 5 parts by weight of sulfite wood pulp of 100 cc. Canadian Standard Freeness were produced in accordance with standard papermaking procedure. The sheets having a basis weight of 80 lbs. per ream were treated as described in Example 10. The resulting paper had excellent wet and dry strengths and could be readily saturated with synthetic rubber latices or resins from either aqueous or solvent systems. It was also suitable for use as filter paper.

EXAMPLE 12

The procedure of Example 11 was repeated, except that sheets composed of 80 parts by weight of nylon-6,6 and 20 parts by weight of bleached kraft wood pulp were employed.

The results obtained, as compared to the untreated control, are shown in the following Table 1. The standard TAPPI testing methods were employed.

*Table 1*

|  | Untreated control | Treated sheets |
|---|---|---|
| Basis weight, lbs./ream | 54 | 54 |
| Mullen bursting strength, lbs | 14 | 26 |
| Tear, CMD [1] | 13 | 27 |
| Dry tensile strength, lbs.: | | |
| WMD [2] | 4 | 5.3 |
| CMD | 3 | 3.6 |
| Wet tensile strength, lbs.: | | |
| WMD | 2 | 3 |
| CMD | 1.3 | 2.2 |

[1] CMD—Cross machine direction.
[2] WMD—With machine direction.

EXAMPLE 13

Papermaking felt containing 75 parts of wool and 25 parts of nylon was treated as described in Example 5 except that its impregnation period with zinc chloride in dimethyl sulfide solution was 30 seconds. The modified material had all of the nylon fibers covered with a white coating. The nylon fibers were firmly bonded to the wool fibers in the resulting felt. In contrast, nylon fibers could be easily pulled out from the same untreated felt.

It will be apparent to those skilled in the art from the foregoing description that by the process of the present invention I have provided novel modified nylon-containing materials characterized by several important and unusual properties. The nylon-containing materials produced by the practice of the present invention may be obtained in either lustrous or delustered form, both forms having many potential applications where strength, toughness, dimensional stability, etc. of nylon fibers are required.

Having thus described my invention in preferred embodiments, I claim:

1. A process for preparing a modified nylon fiber-containing fabric which comprises treating a nylon fiber-containing fabric with a solution of substantially anhydrous zinc chloride in an unsubstituted lower dialkyl sulfide having up to 4 carbon atoms in each alkyl group for a period in the range of from 1 second to a few minutes and removing the residual solution from the treated fabric, the concentration of zinc chloride in said dialkyl sulfide being from 0.01% to 50% by weight.

2. Modified nylon fiber-containing fabric produced by the process of claim 1.

3. The process of claim 1 wherein the fabric consists wholly of nylon.

4. The process of claim 1 wherein the dialkyl sulfide comprises dimethyl sulfide.

5. The process of claim 1 wherein the concentration of zinc chloride in said dialkyl sulfide is from 1% to 15% by weight.

6. A process for preparing modified nylon fiber which comprises treating a nylon fiber with a solution of substantially anhydrous zinc chloride in dimethyl sulfide for a period in the range of from 1 second to a few minutes and removing the residual solution from the treated fiber, the concentration of zinc chloride in said dimethyl sulfide being from 1% to 15% by weight.

7. Modified nylon fiber produced by the process of claim 6.

8. A process for preparing modified nylon fiber-containing fabric which comprises treating a nylon fiber-containing fabric with a solution of substantially anhydrous zinc chloride in an unsubstituted lower dialkyl sulfide having up to 4 carbon atoms in each alkyl group for a period in the range from 1 second to a few minutes, the concentration of zinc chloride in said dialkyl sulfide being from 0.01% to 50% by weight, thereafter treating the resulting moist fabric with a polar liquid selected from the group consisting of water, lower aliphatic alcohols, and vapors thereof, and removing the residual liquid from the treated fabric.

9. Modified nylon fiber-containing fabric produced by the process of claim 8.

10. The process of claim 8 wherein the fabric consists wholly of nylon fiber.

11. The process of claim 8 wherein the dialkyl sulfide comprises dimethyl sulfide.

12. The process of claim 8 wherein the polar liquid comprises water.

13. The process of claim 8 wherein the concentration of zinc chloride in said dialkyl sulfide is from 1% to 15% by weight.

14. A process for preparing modified nylon fiber which comprises treating a nylon fiber with a solution of substantially anhydrous zinc chloride in dimethyl sulfide for a period in the range of from 1 second to a few minutes, the concentration of zinc chloride in said dimethyl sulfide being from 1% to 15% by weight, thereafter treating the resulting moist fiber with water, and drying the treated fiber.

15. Modified nylon fiber produced by the process of claim 14.

16. The process of claim 15 wherein a number of nylon fibers are in the form of a non-woven web and said web is compressed during the treating thereof with said solution.

17. The process of claim 15 wherein the nylon fiber is treated with said solution at a temperature between 20° C. and 30° C.

References Cited in the file of this patent

UNITED STATES PATENTS

| 2,730,478 | Morgan | Jan. 10, 1956 |
| 2,730,479 | Gibson | Jan. 10, 1956 |
| 2,734,001 | Mecklenburgh | Feb. 7, 1956 |
| 2,869,973 | Hubbard | Jan. 20, 1959 |

FOREIGN PATENTS

| 555,490 | Great Britain | Aug. 25, 1943 |
| 556,925 | Great Britain | Oct. 27, 1943 |
| 574,785 | Great Britain | Jan. 21, 1946 |